United States Patent [19]

Matzner et al.

[11] Patent Number: 5,313,506
[45] Date of Patent: May 17, 1994

[54] REDUCED PRESSURE DROP FERRULE SPACER

[75] Inventors: Bruce Matzner, San Jose, Calif.; Eric B. Johansson, Wrightsville Beach, N.C.

[73] Assignee: General Electric Company, San Jose, Calif.

[21] Appl. No.: 857,153

[22] Filed: Mar. 25, 1992

[51] Int. Cl.5 .............................................. G21C 3/34
[52] U.S. Cl. .................................... 376/441; 376/260
[58] Field of Search ............. 376/448, 441, 439, 443, 376/434, 442, 446, 260; 976/DIG. 73

[56] References Cited

U.S. PATENT DOCUMENTS

| | | | |
|---|---|---|---|
| 3,762,996 | 10/1973 | Nilburn et al. | 376/442 |
| 3,886,038 | 5/1975 | Raven | 376/439 |
| 4,508,676 | 4/1985 | Matzner et al. | 376/438 |
| 4,556,531 | 12/1985 | Curulla | 376/441 |
| 4,772,447 | 9/1988 | Manson et al. | 376/441 |
| 4,869,865 | 9/1989 | White et al. | 376/260 |
| 5,078,961 | 1/1992 | Johansson et al. | 376/448 |
| 5,173,252 | 12/1992 | Johansson | 376/448 |

FOREIGN PATENT DOCUMENTS

| | | |
|---|---|---|
| 0065613 | 12/1982 | European Pat. Off. . |
| 0518306 | 12/1992 | European Pat. Off. . |
| 0528621 | 2/1993 | European Pat. Off. . |
| 3413981 | 10/1984 | Fed. Rep. of Germany . |

Primary Examiner—Peter A. Nelson
Assistant Examiner—Meena Chelliah
Attorney, Agent, or Firm—J. S. Beulick

[57] ABSTRACT

An improved ferrule spacer for use with high density fuel rod arrays within boiling water reactor fuel bundles is disclosed. Ferrules are constructed in mating ferrule pairs. Each ferrule is divided into upper and lower ferrule halves. One ferrule half has sides thereof with the walls removed. The other ferrule half has its in place. The ferrule pairs are confronted with one ferrule inverted with respect to the other and with each complete ferrule wall of one ferrule half being juxtaposed to a ferrule half at a missing wall. Preferably, and at the point of tangency between the ferrule pairs, an aperture for receiving and confining an "H" type double loop spring is defined. The disclosure includes ferrules having a circular surround for the fuel rods and ferrules having an octagon sectioned surround for the fuel rods. Each member of the ferrule pair is symmetrical and completely interchangeable to provide for both convenient assembly and a small inventory of assembly parts.

14 Claims, 6 Drawing Sheets

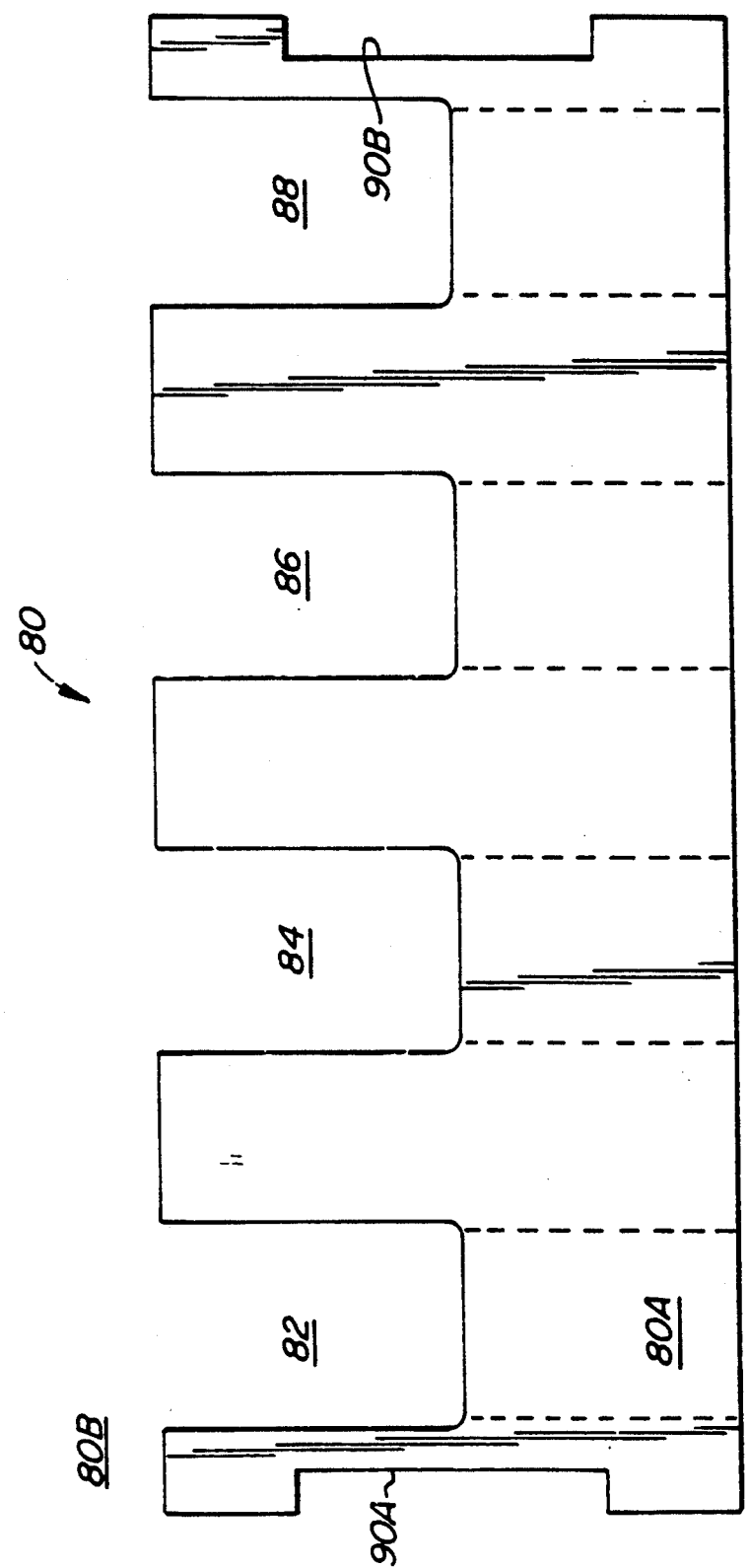

REDUCED PRESSURE DROP FERRULE SPACER

REDUCED PRESSURE DROP FERRULE SPACER

This invention relates to fuel bundles in boiling water nuclear reactors and more particularly to a fuel rod spacer in such a fuel bundle. Specifically, a ferrule spacer is disclosed having both shortened vertical dimension and a single ferrule wall between adjacent fuel rods. The spacer finds preferred use in modern fuel bundle designs having relatively dense arrays of fuel rods where side to side fuel rod spacing is relatively close within the controlled cross sectional dimension available for the fuel bundle.

BACKGROUND OF THE INVENTION

Boiling water nuclear reactors are known. In such reactors, fuel bundles contain the fuel which undergoes the nuclear reaction. Typically, such fuel bundles include a supporting lower tie plate for holding an array of vertically upstanding fuel rods and permitting the entry of water moderator. A channel extends from the bottom tie plate around the fuel rods to an upper tie plate at the top of the fuel bundle. This upper tie plate permits the exit of both water and generated steam.

Interior of the fuel bundle channel and around each of the fuel rods at selected elevations, so-called fuel rod spacers are utilized. It is the function of these fuel rod spacers to prevent the fuel rods from coming into abrading contact one with another under the fluid flow dynamic forces of steam generation as well as to maintain the designed nuclear spacing of the fuel rods for maximum nuclear efficiency. Accordingly, it is standard practice to include between 5 to 9 fuel rod spacers—and usually 7 fuel rod spacers at usually equal vertical intervals within each fuel bundle.

Operation of the fuel bundles can be simply described. Water moderator enters the fuel bundle at the lower tie plate where the water assists the nuclear reaction in two ways. First, the reaction produces fast neutrons which must be moderated or slowed down to their thermal state where their velocity corresponds to their thermal energy due to the moderator thermal energy for continuing the reaction. Secondly, the water coolant permits the fuel bundles to generate steam from which the power generated by the reactor can be extracted. Initially, and in the lower portion of the fuel bundle, water enters—with no steam being present. As the moderator rises up through the fuel bundle, increasing amounts of steam are generated. These increasing amounts of steam cause the upper portion of the fuel bundle to be known as the upper two phase region—these two phases being water and steam. Finally, the water and generated steam exit the upper tie plate of the fuel bundle.

When boiling water reactors having fuel bundles were originally introduced, the fuel channel size was fixed with the design of the original reactor vessel. Hence, most fuel bundles for most boiling water reactors have a length dimension in the order of 160 inches and a square cross section which is approximately $5\frac{1}{4} \times 5\frac{1}{4}$ fitting snugly in a confining channel.

Within the constraining dimensions of the fuel bundles, there has been a tendency to change fuel bundle design. Such change has included the density of the fuel rods within the bundle array utilized within the fuel bundle as well as the types of fuel rod spacers utilized.

Some explanation of the reason behind the design changes is instructive.

Originally, fuel rods—long sealed tubes of Zircaloy cladding surrounding fuel pellets within an inert compressed gas bath—were in arrays of 7 by 7 within the fixed $5\frac{1}{4}$ inch by $5\frac{1}{4}$ inch fuel channel cross section. Among other factors, such fuel bundles were constrained by their maximum linear heat generation rate. Maximum linear heat generation rate is the maximum amount of power per unit length that any fuel rod can safely output anywhere within the fuel bundle. Where this maximum linear heat generation rate is exceeded, the sealed integrity of the fuel bundle can be threatened at least along the length of the fuel rod where the maximum linear heat generation rate has been exceeded. This threat is due to excessive strain which can lead to degradation of the metallurgical qualities of the containing and sealed fuel rod cladding.

Maximum linear heat generation rate limitations caused fuel designs to utilize relatively denser arrays of fuel rods which have greater total linear feet of rod length in a bundle. These dense arrays have included 8 by 8 arrays, 9 by 9 arrays and even higher density arrays such as 10 by 10. These higher density arrays accommodate fuel rods of smaller diameter which more rapidly transfer their heat to the surrounding coolant. Such smaller diameter less massive fuel rods have the fortunate effect having a maximum linear heat generation rate which can be tolerated within the fuel rods. Thus the modern tendency is to include in fuel bundle designs, fuel rod arrays having higher densities.

At the same time, so-called critical power is also a limitation on fuel bundle design. This limitation is related to the phenomena known as "boiling transition." Simply summarized, in the upper two phase region of a fuel bundle, water typically forms a coating over the surface of the fuel rods. Steam is generated from the surface of this film of liquid. Through a complex process—which process is not entirely understood—this film of water maintains itself covering the exterior cladding of the fuel rods—provided that the so-called critical power limitation of the fuel rods is not exceeded.

When the critical power limitation of the fuel rod is exceeded, the fuel rod no longer has a continuous coating of liquid over its surface. Instead—and through the process known as "transition boiling"—local interruptions of the water coating occur. As a consequence, the local temperature of the fuel rod cladding rises at the point of transition boiling. The integrity of the fuel rod is locally threatened due to possible metallurgical break down of the cladding wall at the point of transition boiling.

It has been found that so-called ferrule spacers can have a beneficial effect on critical power. To understand this beneficial effect—and its limitations on high density arrays of fuel rods, both the construction and the effect of such ferrule spacers should be summarized.

Regarding the construction of ferrule spacers, each fuel rod at the elevation of the spacer is surrounded by a cylinder of metal—usually an alloy known as Zircaloy having a relatively small cross section for the absorption of neutrons. Each ferrule defines a plurality of stops against which the fuel contained fuel rod can be spring biased to maintain the designed spacing of the fuel rods. Springs to effect the spring bias of the fuel rods are usually mounted within the ferrules. Thus the spacers not only prevent the side-to-side abrading contact of the fuel rods but serve to maintain the fuel rods in their designed spaced apart relation for maximum nuclear and thermal efficiency.

The effect of such ferrule spacers on the critical power of such fuel rods can be set forth. Specifically, and after the steam/water mixture in the upper two phase region of the fuel bundle has passed through a ferrule of a ferrule spacer, the water coating on the outside of the fuel rod tends to be restored. By controlling the vertical spacing interval either between the first and second spacers from the top of the fuel bundle—or the second and third spacers from the top of the fuel bundle, ferrule spacers can improve the critical power limitation in nuclear fuel bundles.

Unfortunately, utilizing ferrule spacers in high density fuel rod arrays is not without problems. Specifically, and where for example a 9 by 9 array of fuel rods is utilized, each of the fuel rods must be surrounded by its own discrete ferrule. Thus, across the relatively narrow 5¼ inch by 5¼ inch section of a fuel bundle containing an array of 9 by 9 fuel rods, no less than 18 ferrule walls must be disposed along with each of the 9 fuel rods and sufficient clearance for the passage of water being generated into steam between the fuel rods and the ferrules. In other words, where the number of fuel rods extending across a fuel bundle goes up, so does the number of ferrule walls required for maintaining a ferrule rod spacer.

As the number of required ferrule walls increases together with the number of fuel rods to be surrounded, and the available cross sectional dimension (about 5¼ inches by about 5¼ inches) remains unchanged, the clearance between the fuel rods and ferrules shrinks. Gradually, this clearance approaches that point where the gap between the ferrules and the fuel rods become so narrow that this gap becomes a likely candidate for the buildup of resident debris within the reactor as well as a likely location for corrosion.

An additional problem arises because of the close packing of fuel rods and ferrules in high density arrays; the ferrules occupy a greater fraction of the fuel bundle cross section, and cause a greater pressure drop as the coolant passes through the spacer.

Therefore, the use of ferrule spacers in high density arrays has been limited.

The invention disclosed herein addresses the two problems described above; namely the small gap between the fuel rod and ferrule, and the increased pressure drop which occurs in high density fuel rod arrays.

RELATED PATENT APPLICATION

Not Prior Art

In Johansson U.S. Pat. application Ser. No. 07/745,293 filed Aug. 12, 1991 entitled Hydride Resistant Spacer Formed From Interlocking Strips, now U.S. Pat. No. 5,130,083 issued Jul. 14, 1992, now of the inventors herein discloses a spacer construction interlocking strips extending diagonally the length of the fuel bundle spacer. Like the present invention, a spacer construction is utilized where only one ferrule wall separates adjacent fuel rods at their point of tangency.

As compared to the disclosure herein, three important distinctions are present. First, the spacer therein disclosed is required to utilize metal strips of differing length. Such a required inventory of parts constitutes and excessive surcharge on the manufacturing process.

Secondly, the attachment of springs to the disclosed spacer is not without problems. Specifically, fastening of the springs to the cell matrix locations requires the use of loop springs carefully placed to the interlocking strips. Unfortunately, and due to the particular design utilized, the trapping of springs having reduced height between the cells is difficult.

Thirdly, no spacer design of this type has ever been used or attempted in a commercial fuel design in the past.

In Johansson et. al. U.S. Pat. No. 5,078,961 entitled Self Locating Springs for Ferrule Spacer filed Dec. 6, 1990, I disclose at least at FIG. 17 an improved loop spring. This loop spring, illustrated in the attached specification at FIG. 2, includes first and second vertical legs containing rod contacting portions. One vertical leg at one rod contacting portion extends interior of a first ferrule of a ferrule spacer to bias a fuel rod within that ferrule. The other vertical leg at the other rod contacting portion extends interior of an adjacent second ferrule of a ferrule spacer to bias the adjacent fuel rod within that adjacent ferrule. This disclosed spring has a shortened construction.

This shortened construction is provided by two horizontal loops, these horizontal loops being positioned one loop at the top of the spring and the remaining loop at the bottom of the spring.

The first and top horizontal loop is connected at its central portion to the top of each of the spring legs. The second and bottom horizontal loop is connected at its central portion to the bottom of each of the spring legs. Thus, each of the spring legs in being compressed flexes over the vertical length of the spring legs as well as the horizontal length of the top and bottom loops. A spring have a reduced vertical dimension with a superior deflection range results.

SUMMARY OF THE INVENTION

An improved ferrule spacer for use with high density fuel rod arrays within boiling water reactor fuel bundles is disclosed. This spacer uses a new spring design which allows a reduced ferrule height. One embodiment uses the new spring design and reduced height ferrules A second embodiment also uses the new spring with a reduced height ferrule, but uses a modified ferrule. Ferrules are constructed in mating ferrule pairs. Each ferrule is divided into upper and lower ferrule halves. One ferrule half has sides thereof with the walls removed. The other ferrule half has its in place. The ferrule pairs are confronted with each complete ferrule wall of one ferrule half being juxtaposed to a ferrule half at a missing wall. Preferably, and at the point of tangency between the ferrule pairs, an aperture for receiving and confining an "H" type double loop spring is defined. The disclosure includes ferrules having a circular surround for the fuel rods and ferrules having an octagon sectioned surround for the fuel rods. Each member of the ferrule pair is symmetrical and completely interchangeable to provide for both convenient assembly and a small inventory of assembly parts.

The reader will understand that over the construction of the prior art wherein two ferrules walls are adjacent to one another between fuel rods, improved pressure drop results. Specifically, the spacer contains less material and has a lesser projected area presented to the flowing fluid. The reduction of both the projected area and the total amount of material within the spacer design here disclosed combines to give improved pressure drop performance.

BRIEF DESCRIPTION OF THE DRAWINGS

FIG. 5 is a side elevation of a metal blank for forming an octagon shaped ferrule member;

DESCRIPTION OF THE PREFERRED EMBODIMENT

Figure 1:
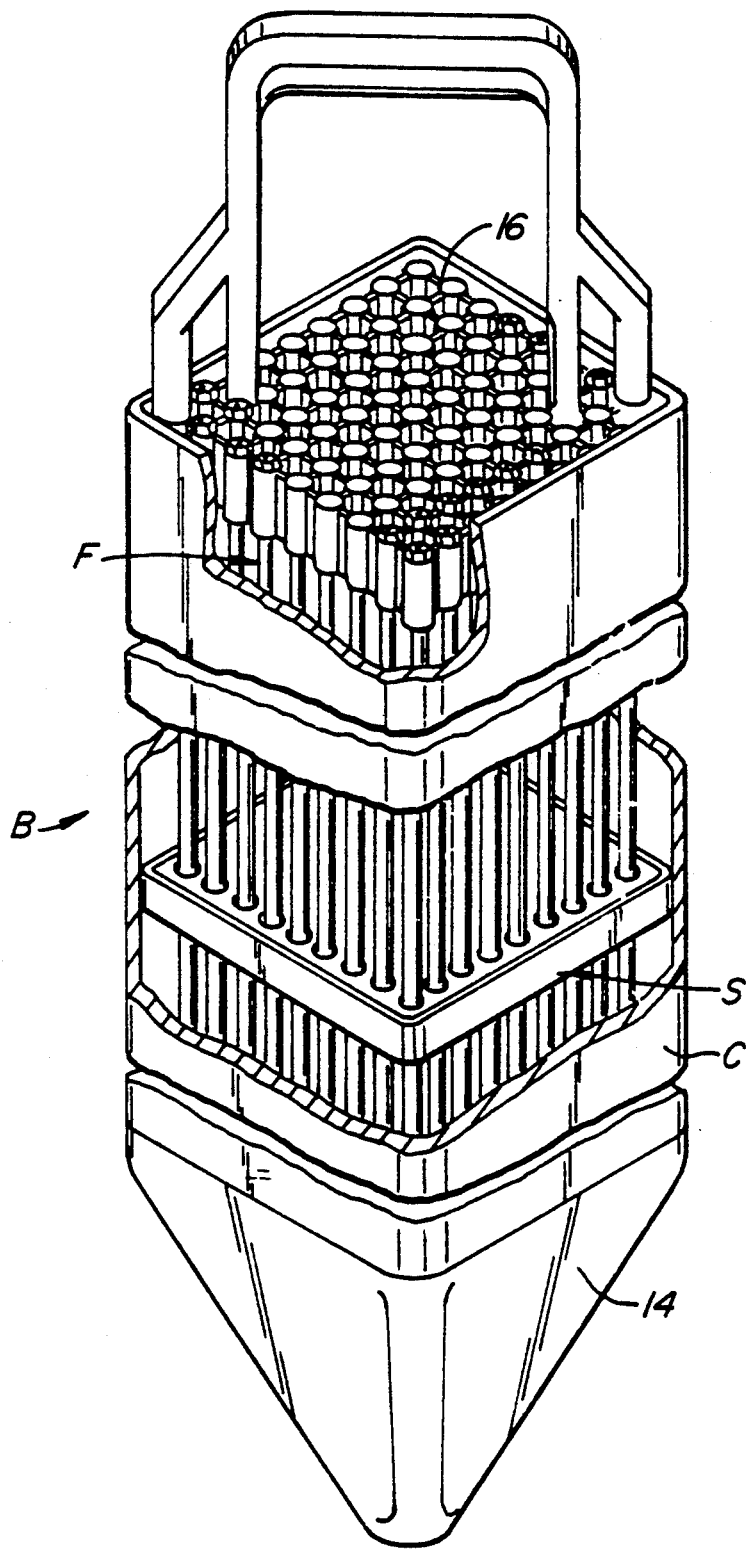
FIG. 1 is a perspective view of a fuel bundle with much of the vertical section of the fuel bundle broken away for view of one of the many spacers utilized in the fuel bundle construction.

Referring to FIG. 1, a typical prior art fuel bundle B is shown. The fuel bundle B includes a lower tie plate 14, and upper tie plate 16 and a plurality of fuel rods F in a matrix extending between the respective tie plates. The tie plates 14, 16 as well as the fuel rods F are surrounded by a channel C, which channel C is broken away so that a single spacer S can be seen. Spacer S is the subject of this invention. More particularly, a spacer S of the ferrule type is the subject of this patent application.

Figure 2:
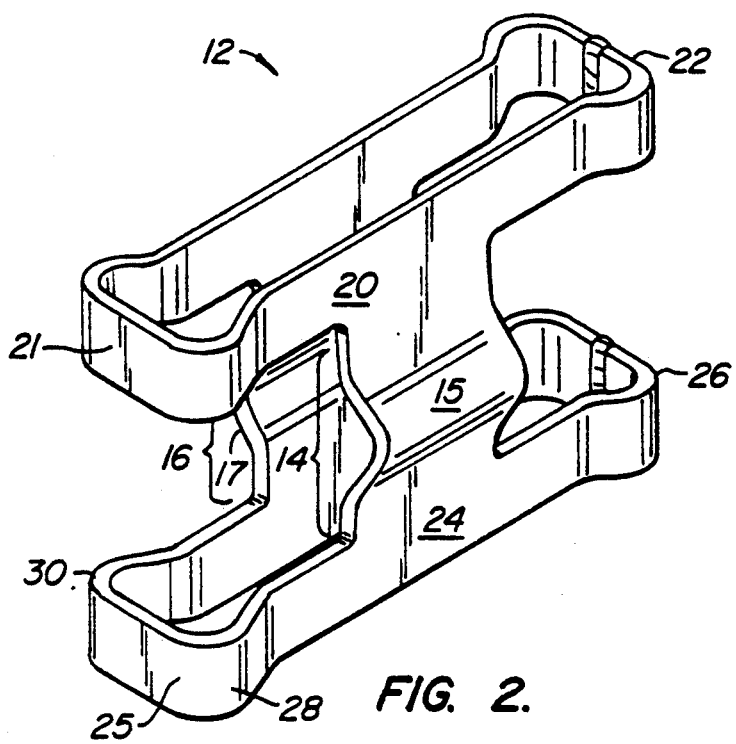
FIG. 2 is a perspective view of a spring suitable for use with the disclosed spacer of this invention, this spring being taken from Johansson et. al. U.S. Pat. application Ser. No. 07/623,828 entitled Self Locating Springs for Ferrule Spacer filed Dec. 6, 1990 at FIG. 18.

FIG. 2 is an illustration of a particularly advantageous spring 12. This spring is taken from Johansson et. al. U.S. Pat. application Ser. No. 07/623,828 entitled Self Locating Springs for Ferrule Spacer filed Dec. 6, 1990 at FIG. 17. The content of this patent application is herein incorporated by reference.

This loop spring, illustrated in the attached specification at FIG. 2, includes first and second vertical legs 14 and 16 containing rod contacting portions 15, 17. One vertical leg at one rod contacting portion extends interior of a first ferrule of a ferrule spacer to bias a fuel rod within that ferrule. The other vertical leg at the other rod contacting portion extends interior of an adjacent second ferrule of a ferrule spacer to bias the adjacent fuel rod within that adjacent ferrule. This disclosed spring has a shortened construction.

This shortened construction is provided by two horizontal loops 20, 24; these horizontal loops being positioned one loop 20 at the top of the spring and the remaining loop 24 at the bottom of the spring.

The first and top horizontal loop is connected at its central portion to the top of each of the spring legs 14, 16. The second and bottom horizontal loop is connected at its central portion to the bottom of each of the spring legs 14, 16. Thus, the spring when compressed flexes over the vertical length of the spring legs 14, 16 as well as the horizontal length of the top and bottom loops 20, 24.

The respective top and bottom horizontal loops 20, 24 are provided with expanded loop ends 21, 22 in loop 20 and 25, 26 in loop 24. This expansion is labeled in an exemplary fashion at expanded sections 28, 30 in expanded end 25 of loop 24.

A spring having a reduced vertical dimension with a superior deflection range results. As will hereinafter become more apparent, I prefer to trap this spring at the expanded ends 25 between opposing ferrules for the construction of the preferred spacer of this invention.

Figure 3A:
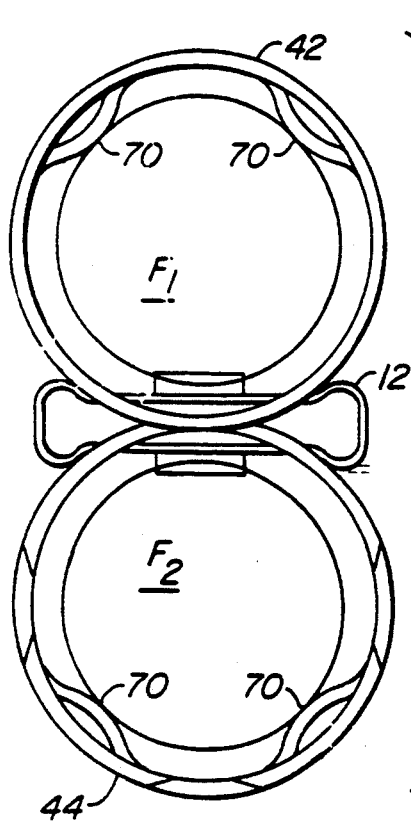
FIG. 3A and 3B are respective plan and side elevations of a circular ferrule pair of a spacer design of shortened height according to a first embodiment of this disclosure.
Figure 3B:
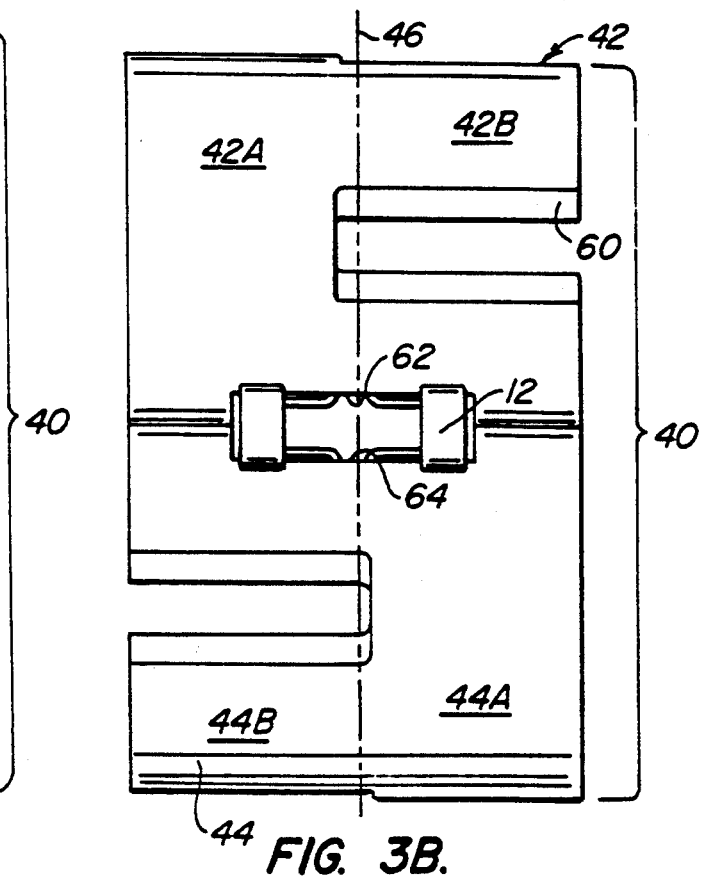

Referring to FIGS. 3A and 3B the first embodiment of a ferrule pair 40 can be seen and understood. With reference to FIG. 3B, ferrule 42 includes solid section 42A and apertured section 42B having aperture 60 therein. Likes wise ferrule 44 includes solid section 44A and apertured section 44B. It will be appreciated that in each of the apertured sections, four apertures 60 appear. Appropriate stops 70 are configured interior of the ferrules.

It will be further understood that between each ferrule pair 42, 44, there is defined a spring capturing window. Spring 12 (See FIG. 2) is first place within the aperture 62 of partially confronted ferrules and thereafter confrontation occurs. There results the composite construction which is the essential building element of the spacer construction of this invention.

Figure 4:
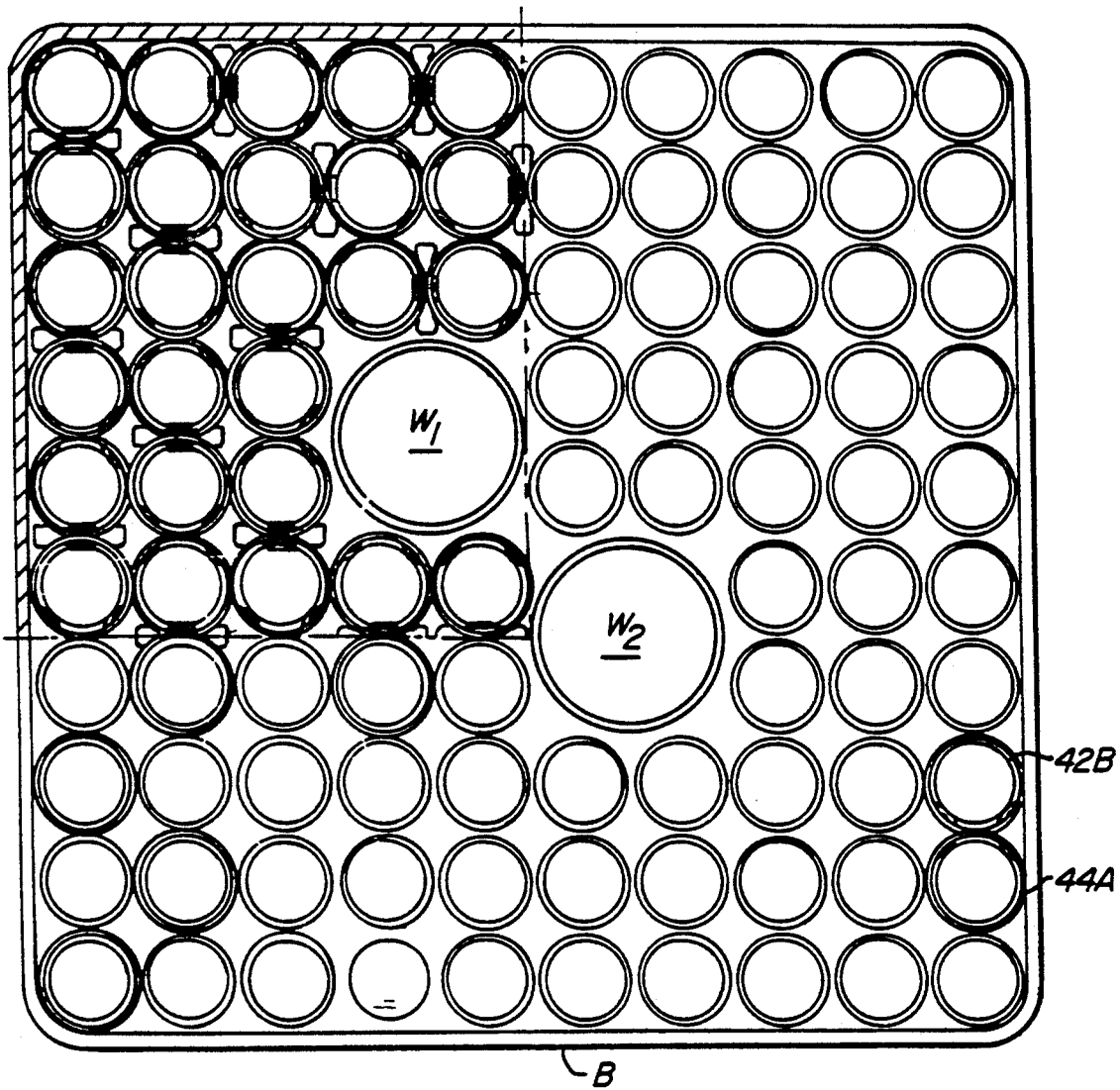
FIG. 4 is a plan view of a ferrule spacer in a 10 by 10 fuel rod array containing two water rods and 92 ferrules.

Referring to FIG. 4, a completed spacer S is shown using the ferrules of FIGS. 3A and 3B. This spacer S defines intervals for water rods W1 and W2. As the bracing of these water rods W1 and W2, and the exterior band are conventional, they are not shown.

Referring to FIGS. 3A and 3B, the preferred embodiment of a ferrule pair 40 can be seen and understood.

Referring to FIG. 3B, first ferrule section 42 is shown confronted to second ferrule section 44. Examining FIG. 3B further, it can be seen that a centerline 46 divides each ferrule of the ferrule pair 42, 44 into respective halves. Ferrule 42 has halves 42A and 42B; ferrule 44 has halves 44A and 44B.

Provision must be made for the confrontation of the respective ferrule halves so as to define only one ferrule wall even though two ferrules are confronted. Accordingly, ferrule halves 42B and 44B have four portions of their respective walls milled away. Specifically, a milling tool is utilized which has two characteristics.

First, the milling tool has a diameter slightly exceeding the diameter of the adjacent ferrules. Secondly, the milling tool when cutting away the wall is centered just as the adjacent ferrule would be centered.

The result is milled intervals 60. Four such intervals are placed in ferrule halves 42B and four such intervals are milled in ferrule halves 44B. In order to accommodate the subsequent fit, it will be observed that the milling process exceeds in vertical dimension slightly the half dimension of the spacer halves 42B and 44B.

The fit between the respective ferrule halves is as shown in FIGS. 3A and 3B. Referring to FIG. 3B, it can be seen that ferrule half 42A fits adjacent ferrule half 44B; likewise it can be seen that ferrule half 42B fits adjacent ferrule half 44A. As is shown in the plan view of FIG. 3A, with such an arrangement, the contiguous and tangent portions of ferrule halves 42A and 44B define only one ferrule wall between adjacent fuel rods F1, F2. That is, as best seen in FIG. 3A, the ferrule half 42a with walls present includes a wall portion which extends within the slot 60 of the ferrule half 44b and consequently only a single wall lies between adjacent fuel rods along a line extending parallel to the axes of the ferrules and along a tangency between the ferrule pair 40.

The rest of the construction is conventional. A ferrule spring 12 is trapped between ferrule aperture 62 in ferrule 42 and ferrule aperture 64 in ferrule 44. As has been illustrated in Johansson et al. U.S. Pat. application Ser. No. 07/623,828 entitled Self Locating Springs for Ferrule Spacer filed Dec. 6, 1990, spring 12 is captured at the respective loops interior of the confronted ferrules. As is further conventional, the respective ferrule halves 42A, 42B, 44A and 44B define respective stops 70 into which fuel rods F1 and F2 are biased by spring 12.

Turning to FIG. 4, a spacer S constructed of the ferrules is illustrated. In the plan view of FIG. 6, the orientation of two water rods W1 and W2 is shown. As bracing of the water rods at the spacer S is conventional, it is not shown.

This invention can be applied to spacers. S having octagon shaped sections. Such is shown in FIGS. 5, 6A, 6B and 7.

Referring to FIG. 5, a Zircaloy metal sheet is shown immediately before being bent into an octagon shape. As before, the cell 80 is divided into halves 80A and 80B. In the upper half 80B of spacer 80, four walls are removed at 82, 84, 86, and 88. These removals slightly intrude upon half 80A of the ferrule cell metal sheet. Conventional apertures 90A and 90B are configured for trapping spring 12.

Figure 6A:
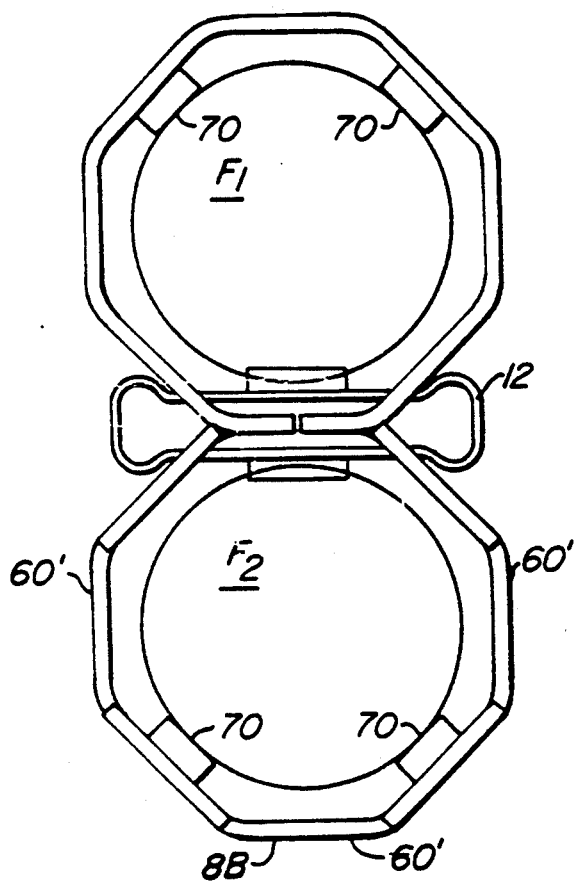
FIG. 6A and 6B are respective plan and side elevations of an octagon ferrule pair of a spacer design similar to FIG. 3A and 3B; and,.
Figure 6B:
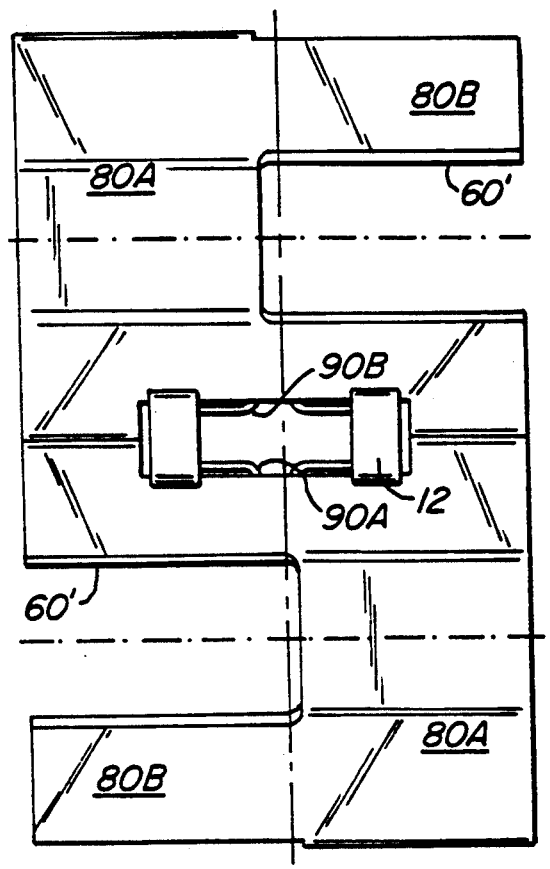

Referring to FIGS. 6A and 6B, two respective cells 80 are assembled. Assembly is by stamping and bending using conventional manufacturing techniques. Consequently, a detailed explanation of the cell formation of the octagon shaped cell will not be offered here.

Referring to FIG. 6B, cells 80 are shown juxtaposed with sections 80A of one cell 80 juxtaposed to section 80B of an adjacent cell 80. Spring 12 is trapped between the cells at apertures formed by 90A and 90B between the respective cells.

Referring to FIG. 6A, fuel rods F1 and F2 are shown biased into conventionally constructed stops 70 by spring 12. It will be observed that only one cell wall is present between fuel rods F1 and F2

Figure 7:
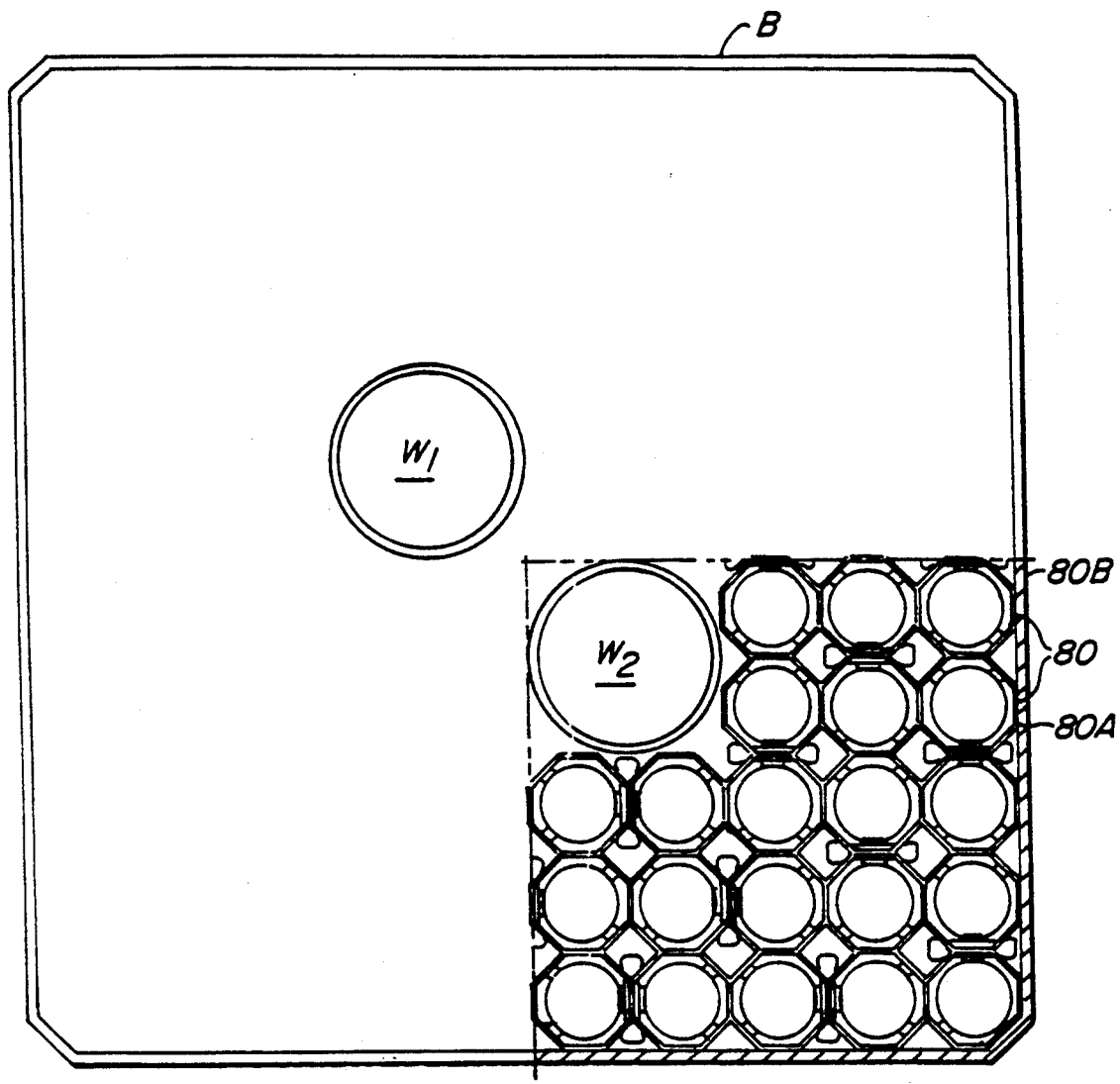
FIG. 7 is a plan view of a ferrule spacer in a 10 by 10 fuel rod array utilizing the octagon shaped ferrule pairs, the spacer being similar to that shown in FIG. 4.

Referring to FIG. 7, a completed spacer S is shown assembled. This spacer S defines intervals for water rods W1 and W2. As the bracing of these water rods W1 and W2 at the spacer and the exterior band are conventional, they are not shown.

The reader will appreciate that the construction technique and process here shown will find applicability in arrays other than the 10 by 10 arrays here illustrated. Further, we have shown one spacer cell half having all of the walls removed. Other combinations of wall removal may be utilized. We prefer the illustrated configuration as providing a reversible cell assembly with a minimum inventory of required parts for assembly of the spacer.

What is claimed is:

1. An improved ferrule spacer for use with high density fuel rod arrays within boiling water reactor fuel bundles comprising in combination:
   a matrix of ferrules for surrounding fuel rods at selected elevations within said fuel bundle, said matrix of ferrules constructed from confronting first and second ferrules arrayed in discrete mating ferrule pairs, said first and second ferrules of said pair thereof extending along spaced parallel axes;
   each said first and second ferrule being divided into upper and lower ferrule halves with at least one ferrule half having a wall removed therefrom;
   the other ferrule half having ferrule complete walls present;
   each said ferrule half with wall removed being laterally juxtaposed to a ferrule half having said walls present whereby said ferrule pair at said respective ferrule halves together define solely a single wall between adjacent fuel rods along a line extending parallel to said axes and along a tangency between the ferrule pair;
   fuel rod stops carried by said ferrules; and
   means carried by said spacer for receiving and confining a spring for biasing fuel rods within said ferrules toward said stops.

2. The spacer according to claim 1 wherein said upper half of said first ferrule is identical in construction with said lower half of said second ferrule, the upper half of said second ferrule being identical in construction with said lower half of said first ferrule.

3. The spacer according to claim 1 wherein said ferrules are circular.

4. The spacer according to claim 1 wherein said ferrules are octagonal.

5. The spacer according to claim 1 wherein said ferrules define a circular surround for the fuel rods.

6. The spacer according to claim 1 wherein said ferrules define an octagon sectioned surround for the fuel rods.

7. The spacer according to claim 1 wherein said confronting ferrules of said ferrule pair define an aperture for capturing a spring therebetween.

8. The spacer according to claim 7 including said spring;
   said spring generally having an "H" profile with first and second overlying leg member defining rod contacting portions for contacting fuel rods placed within said ferrules; and
   upper and lower spring loops fastened to the upper and lower ends of said spring legs for providing increased deflection to said spring whereby said spring can have a reduced vertical dimension between said loops.

9. The spacer according to claim 1 wherein said one ferrule half having a removed wall defines a slot extending generally parallel to the axes of said ferrules opening through an end of said one ferrule half and terminating at an opposite end slightly beyond a media of the height of said spacer.

10. The spacer according to claim 9 wherein a portion of the walls present of said other ferrule extends within said slot to comprise said single wall between adjacent fuel rods.

11. A method for manufacturing an improved ferrule spacer for use with high density fuel rod arrays within boiling water nuclear reactor fuel bundles comprising in combination:
   providing a matrix of ferrules for surrounding fuel rods at selected elevations within said fuel bundle, said matrix of ferrules constructed from adjacent first and second ferrules arrayed in discrete mating ferrule pairs;
   dividing each said first and second ferrules into upper and lower ferrule halves;
   removing from one said ferrule half at least one portion of a ferrule wall at a point of tangency to its adjacent ferrule of the ferrule pair;

confronting said ferrule pairs with each complete ferrule wall being adjacent a ferrule half having said missing wall portion whereby said ferrule pair define a single wall between adjacent fuel rods at the point of tangency between ferrules of said ferrule pair;

defining fuel rod stops configured with respect to said ferrule walls; and defining an aperture for receiving and confining a spring confined between the ferrules of said ferrule pair thereof with a first portion of said spring protruding into one of said ferrules of said ferrule pair and a second portion of said spring protruding into the second ferrule of said ferrule pair for biasing fuel rods within said ferrule pair into said stops; and confronting said ferrule pairs to form a matrix of ferrules each surrounding a fuel rod at a selected elevation within a fuel bundle.

12. The method according to claim 11 wherein said step of providing said spring includes:

providing a generally "H" profiled spring having first and second overlying leg member defining rod contacting portions for contacting fuel rods placed within said ferrules; and providing upper and lower spring loops fastened to the upper and lower ends of said spring legs to afford increased deflection to said spring whereby said spring can have a reduced vertical dimension between said loops.

13. The method according to claim 11 wherein said removing step includes removing said ferrule walls on four sides of said one ferrule half.

14. In a fuel bundle including:

a lower tie plate for supporting a plurality of upstanding fuel rods and permitting the entry of water coolant around said fuel rods;

an upper tie plate for holding the upper end of at least some of said fuel rods and permitting the exit of water coolant and generated steam from said fuel bundle;

a channel surrounding said fuel bundle including said lower tie plate, said fuel rods and said upper tie plate to define an isolated flow path through said fuel bundle; and at least one improved ferrule spacer for use with fuel rod arrays within boiling water reactor fuel bundles comprising in combination;

a matrix of ferrules for surrounding fuel rods at selected elevations within said fuel bundle, said matrix of ferrules constructed from first and second ferrules arrayed in discrete mating ferrule pairs with said first and second ferrules of said pair thereof extending along spaced parallel axes;

each said ferrule being divided into upper and lower ferrule halves with at least one ferrule half having walls removed therefrom;

the other ferrule half having ferrule walls present;

each said ferrule half with walls removed being laterally juxtaposed to a ferrule half having said walls present whereby said ferrule pair at said respective ferrule halves together define solely a single wall between adjacent fuel rods along a line extending parallel to said axis and along a tangency between the ferrule pair;

fuel rod stops carried by said first and second ferrules; and means carried by said spacer for receiving and confining a spring for biasing fuel rods within said ferrules toward said stops.

* * * * *